US012407109B2

(12) United States Patent
Cook

(10) Patent No.: US 12,407,109 B2
(45) Date of Patent: Sep. 2, 2025

(54) UNDERGROUND MONOPOLE ANTENNA SHELL

(71) Applicant: Nicor, Inc., Dripping Springs, TX (US)

(72) Inventor: Jeffrey A. Cook, Dripping Springs, TX (US)

(73) Assignee: NICOR, INC., Dripping Springs, TX (US)

( * ) Notice: Subject to any disclaimer, the term of this patent is extended or adjusted under 35 U.S.C. 154(b) by 0 days.

(21) Appl. No.: 18/274,569

(22) PCT Filed: Jul. 20, 2022

(86) PCT No.: PCT/US2022/073972
§ 371 (c)(1),
(2) Date: Jul. 27, 2023

(87) PCT Pub. No.: WO2023/004369
PCT Pub. Date: Jan. 26, 2023

(65) Prior Publication Data

US 2024/0120657 A1 Apr. 11, 2024

Related U.S. Application Data

(60) Provisional application No. 63/203,383, filed on Jul. 20, 2021.

(51) Int. Cl.
*H01Q 9/32* (2006.01)
*H01Q 1/04* (2006.01)
*H01Q 1/22* (2006.01)

(52) U.S. Cl.
CPC ................. *H01Q 9/32* (2013.01); *H01Q 1/04* (2013.01); *H01Q 1/2233* (2013.01)

(58) Field of Classification Search
CPC .. H01Q 9/32; H01Q 1/24; H01Q 1/44; H01Q 1/42; H01Q 1/27; H01Q 1/2216; H01Q 1/32; H01Q 1/22; G01D 4/002
See application file for complete search history.

(56) References Cited

U.S. PATENT DOCUMENTS

| | | | | |
|---|---|---|---|---|
| 10,276,939 B1 * | 4/2019 | Webb | H01Q 9/0464 |
| 2008/0074283 A1 * | 3/2008 | Verkleeren | H01Q 1/2233 340/870.02 |
| 2022/0285821 A1 * | 9/2022 | Ragan | H01Q 9/32 |

* cited by examiner

*Primary Examiner* — Dameon E Levi
*Assistant Examiner* — Gurbir Singh
(74) *Attorney, Agent, or Firm* — Andrew F. Young, Esq.; NOLTE LACKENBACH SIEGEL

(57) ABSTRACT

An antenna and antenna enclosure including a housing having a cylindrical first portion defining a hollow interior volume with an inner diameter, a cylindrical second portion defining a hollow interior portion having an inner diameter greater than the inner diameter of the first portion, and a disk disposed inside the second portion and defining a central hole. A rod is disposed in and extends through the central hole of the disk and is captured in the hollow interior volume of the cylindrical first portion. The rod defines a central opening and abuts an inner surface of the disk. A wire is arranged inside the central opening, and a cap covers the hollow interior of the cylindrical portion and engages the housing. A circuit board for the antenna is disposed on underside of the cap and connects to the wire.

2 Claims, 4 Drawing Sheets

UNDERGROUND MONOPOLE ANTENNA SHELL

BACKGROUND OF THE INVENTION

Technical Field

The present invention relates most generally to electronic instruments, and more particularly to antennas, and still more particularly to an underground antenna and antenna housing for the transmission of signals to a receiver in an automatic meter reading (AMR) system.

Background Art

It is known to connect transmitting antennas to inaccessible metering systems for transmitting information relating to a customer's use of public goods provided by utility companies—e.g., water, natural gas, and electricity. When the meters are inaccessible or simply located in secured locations, one or more transmitting/communicating devices may be connected to the meter and signals transmitted to receivers or data centers in Automatic Meter Reading (AMR) and Automatic Metering Infrastructure (AMI) systems. Such meters and the transmitting antennas may be co-located for visual isolation and physical protection, for instance by placing the meter and antenna in an underground pit.

Prior art underground AMR/AMI antennas are expensive and include the use of a dielectric gel as the antenna encapsulating and potting material. The dielectric gel is filled between a copper loop connected with a circuit board and an outer housing. The performance characteristics of antennas encapsulated in gel potting material are less than optimal.

However, providing an enclosure fabricated from solid dielectric as the potting material introduces manufacturing challenges, particularly when the material is thermoplastic and the preferred manufacturing process is injection molding. This is because injection molding any portion of a part having a thickness exceeding ½ inch will create sink marks and/or voids unless the part is allowed to cool entirely in the mold. The cycle time makes such an approach prohibitively costly, and the part cost correspondingly so. Additionally, an antenna enclosure with vast density variations degrades RF performance characteristics.

Accordingly, it would be desirable to provide an underground monopole antenna enclosure that may be economically and efficiently fabricated using injection molding techniques and that has physical properties conducive to the optimal transmission and reception of RF signals.

DISCLOSURE OF INVENTION

In embodiments, the antenna and antenna enclosure of the present invention includes a housing having a first portion with an inner diameter, a second portion having an inner diameter greater than the inner diameter of the first portion, and a disk disposed inside the second portion and defining a central hole. The antenna further includes a rod disposed in and extending through the central hole and arranged inside the first portion. The rod defines a central opening and abuts an inner surface of the disk. Further, the antenna includes a wire arranged inside the central opening, and a cap arranged covering the chamber and engaged with the housing. Moreover, a circuit board of the antenna is arranged inside the cap and connected to the wire.

The instant disclosure also includes a method of making a monopole antenna enclosure using a solid dielectric potting and encapsulating material.

At transmitted power levels consistent with long battery life, this inventive antenna and antenna enclosure is linear. There are no heating effects of significance in any of the materials, so transmitted power levels are not a performance consideration.

Another salient feature of the invention is the uniformity in azimuth pattern. The azimuth pattern is a uniform (omnidirectional) radiation pattern. This is advantageous over directional antennas because of installation simplicity (i.e., it does not need to be oriented), and because it compensates for the vagaries and unpredictability in multipath propagation due to slight propagation velocity differences owing to temperature and humidity, as well as the presence and movements of automobiles and other reflective objects in the environment.

While the advantages of an omnidirectional propagation pattern can be undermined by random holes ("sinks") in the enclosing dielectric, the present invention obviates this problem by using entirely solid, injection molded dielectric material as the potting material.

The antenna may be implemented for use in the 902-928 MHz unlicensed band, but the principles apply at any operating frequency. Dielectric materials are used to reduce the size of the antenna. (This is a direct result of the slower propagation velocity in materials of higher dielectric constant). Size reduction to fit in meter pits and maintain resonant efficiency is required. The choice of dielectric material involves trade-offs between an optimal dielectric constant, dielectric loss, the cost of material, and the cost of forming the material into the desired shape. Polypropylene provides a good compromise among these considerations. However, other materials may be suitable without departing from the spirit and scope of this invention. Consideration of other operating parameters (e.g., frequency) may dictate the choice of other materials for the potting and encapsulating enclosure.

For a more complete understanding of the present invention, reference is made to the following detailed description and accompanying drawings. In the drawing, like reference characters refer to like parts throughout the views.

BEST MODE FOR CARRYING OUT THE INVENTION

Figure 1:
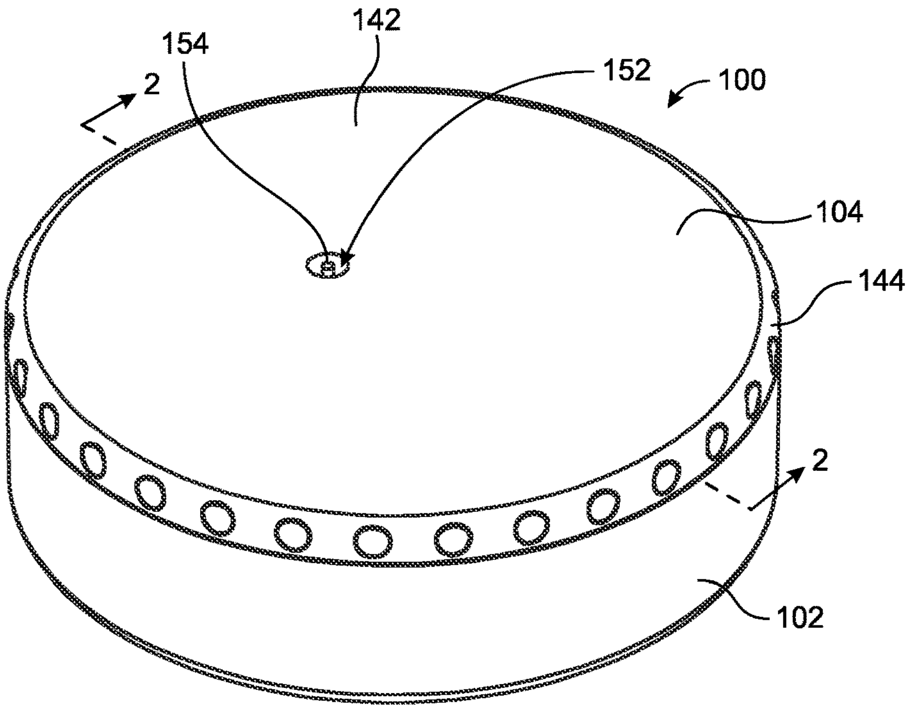
FIG. 1 is an upper perspective view of an embodiment of the monopole antenna of the present invention.

Referring to FIGS. 1, 2, 5, 6, and 7, each show an antenna 100 for transmitting signals from a metering site. The antenna 100 is a monopole antenna adapted for placement on a floor or on ground in an underground location. The antenna includes a molded housing 102 or shell, a cover plate 104, a disk 106, a rod 108, a circuit board 110, and a conductive metal wire 112.

As shown in FIG. 2, and FIGS. 5-7, the housing 102 defines an interior chamber 114 and includes mounting structure, which in embodiments may be an integral hollow threaded cylindrical post 120 having a distal end 116. The threaded cylindrical post 120 may be considered a cylindrical first portion of the housing 102, which also includes a cylindrical second portion 122, also defining an interior volume 114 in fluid communication with the interior volume 120 of the first cylindrical portion 126 (e.g., the threaded post). The cylindrical second portion 122 includes a circumferential rim 118 surrounding and defining the access opening 130 to the interior volume 114 in the cylindrical second portion and comprises an end of the housing opposite that of the distal end 116.

The interior volume 121 of the cylindrical first portion (or threaded post) 120 has an inner diameter, and the cylindrical second portion 122 has an inner diameter greater than the inner diameter of the cylindrical first portion 126. It will be appreciated that the cylindrical first and second portions of the housing are axially arranged around the central axis CA of the housing. A generally planar base 124 extends around the opening 125 to the interior volume 121 of the first cylindrical portion 120.

The first (distal) end 116 of the cylindrical first portion (threaded post) 120 is a closed integral cap 126, while the rim 118 of the cylindrical second portion is an open end that defines an access opening 130 or interior volume (best shown in FIGS. 5 and 7) in and to the interior chamber 114. As noted, the cylindrical first portion 120 and the cylindrical second portion 122 are configured coaxially.

Housing 102 is formed by molding and may be formed by an injection molding process. In an embodiment, the housing 102 is made of polypropylene. The cylindrical first portion 120 is shown with outer threads 132 (best shown in FIGS. 2, 6, and 7) as an exemplary means for securing the antenna shell to the underside of an AMR/AMI meter box lid by securing it with a bolt or screw screwed into a standoff having complementary female threads. However, it will be appreciated that the mounting structure may be configured to cooperate with any of a number of structures on a meter box lid, such as brackets.

Further, the rim 118 of the cylindrical second portion 122 of the housing 102 includes a circumferential channel 134 (best seen in FIGS. 3, 5, and 7) extending around the entirety of the circumference of the rim. As shown, the channel 134 includes an inner wall 136 and an outer wall 138 defining a groove 140 therebetween (best shown in FIG. 5 and FIG. 7). In the embodiment, a height of the inner wall 136 is greater than a height of the outer wall 138, and the groove 140 extends circumferentially around the entirety of the channel structure. This configuration facilitates an engagement of the housing 102 with the cover plate 104 of the antenna 100.

The cover plate 104 is configured to cover the access opening 130 of the housing 102, and includes a planar central disk 142 and a sidewall 144 arranged circularly around a central axis of the central disk 142 and extending outwardly and around the central disk 142 and defining a shallow cylindrical chamber 146. Additionally, the cover plate 104 includes a tongue structure 148 extending outwardly in an axial direction from an edge of the sidewall 144. The tongue structure 148 extends circumferentially around the central axis of the cover plate 104 and (as shown on FIG. 2) is adapted to mate with the groove 140 of the housing 102 to facilitate engagement of the cover plate 104 with the housing 102 and to provide a secure enclosure. The width of the tongue structure 148 is smaller than that of the sidewall 144.

Figure 3:
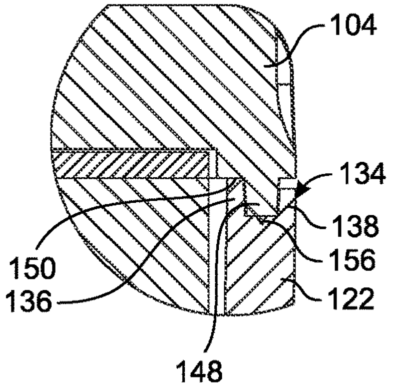
FIG. 3 is a detailed view of an enlarged portion taken along line -3- of FIG. 2.

Accordingly, a seat 150 is defined at an interface of the tongue structure 148 and the sidewall 144 such that the seat 150 extends radially inwardly from the tongue structure 148. The seat 150 is adapted to contact an upper edge of the second portion 122 when the cover plate 104 is engages the housing 102, as shown in FIG. 3. Moreover, the cover plate 104 includes a through hole 152 disposed through the cover plate and oriented with an axis substantially parallel to the central axis CA. The through hole 152 is offset from the central axis and accommodates an inserted cable connector 154. The cable connector 154 may be connected to the circuit board 108 of the antenna 100 arranged inside the shallow volume 146 defined by the cover plate structures. Also, cover plate 104 includes an inverted V-shaped protrusion 156 (best shown in FIG. 3) extending outwardly and axially from the tongue structure 148. The inverted V-shaped protrusion 156 is inserted inside the wall of the second portion 122 when the cover plate 104 is attached to the housing 102. In an embodiment, the cover plate is made of polypropylene and may be made by extrusion molding or injection molding.

Disk 106 has an outer diameter substantially equal to (but slightly smaller than) the second inner diameter of the housing 102 and a height substantially equal to the height of the side wall of the cylindrical second portion 122. Further, the disk 106 defines a central hole 160 (best shown in FIG. 5 and FIG. 7) extending from a first side 162 to a second side 164 of the disk 106.

Figure 2:
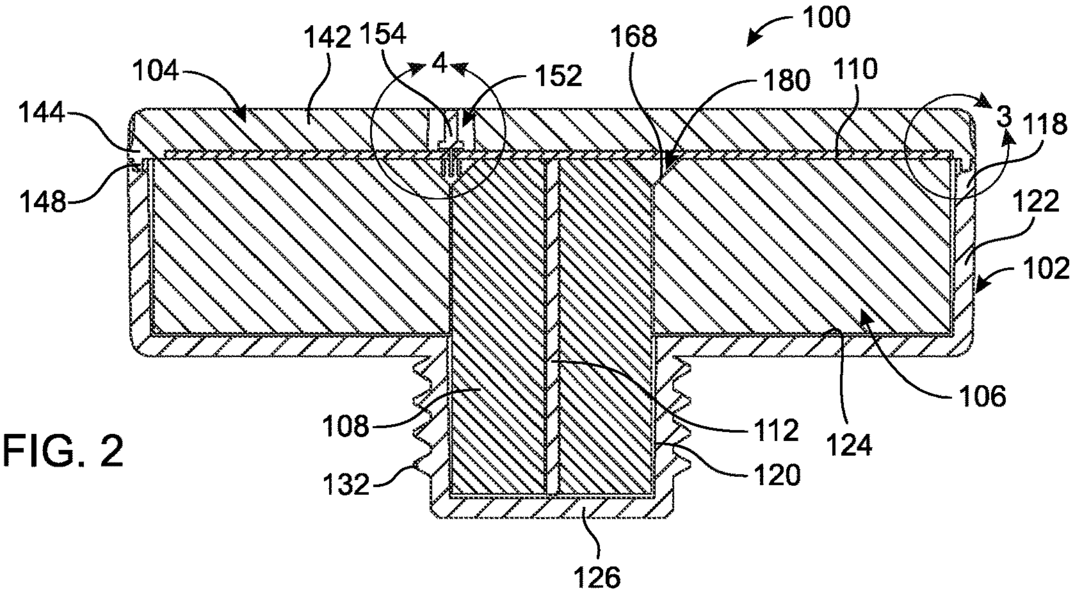
FIG. 2 is a cross-sectional side view in elevation thereof as taken along sectional line 2-2 of FIG. 1.

As seen in FIG. 2, in an assembly of the disk 106, the first side 162 contacts/abuts the seat 150 while the second side 164 approximates or rests upon the planar base 124 surrounding the cylindrical hollow interior 121 of the first portion. Further, an inner cylindrical surface 166 of the disk 106 that defines the central hole 160 includes a beveled portion 168 that tapers inwardly from the first side 162 until it terminates in the cylindrical opening and merges with the cylindrical side wall 170. In an embodiment, the disk 106 is made of polypropylene and is an extruded disk.

The central hole 160 in disk 106 and the hollow interior 121 of cylindrical first portion 120 are each adapted to receive rod 108. The rod 108 has a substantially cylindrical structure and extends through the central hole 160 into the hollow cylindrical volume of the cylindrical first portion 120. In an embodiment, a diameter of the rod 108 is substantially equal to (but slightly smaller than) both the diameter of the first inner diameter and the diameter of the cylindrical portion 170 of the central hole 160 corresponding to the area circumscribed by the inner surface 166. The rod has a height substantially equal to the combined depth of the central hole 160 and the depth of the interior volume 121 of the cylindrical first portion 120.

The rod 108 also defines a central opening 172 extending from a first end 174 to a second end 176. In an embodiment, the diameter of the central opening 172 is substantially equal to (but slightly larger than) the metal wire 112 that extends the length of the central opening 172. The metal wire 112 is made of electrically conducting material, for example, copper and includes a diameter corresponding to 12 American wire gauge (AWG). The wire 112 is adapted to connect/contact the circuit board 110 and has a length substantially equal to the height of the rod 108.

Figure 4:
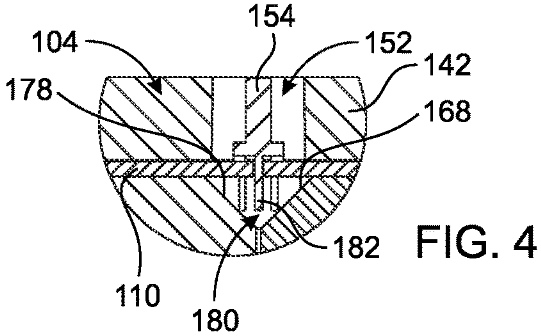
FIG. 4 is a detailed view of an enlarged portion taken along -4- of FIG. 2.
Figure 5:
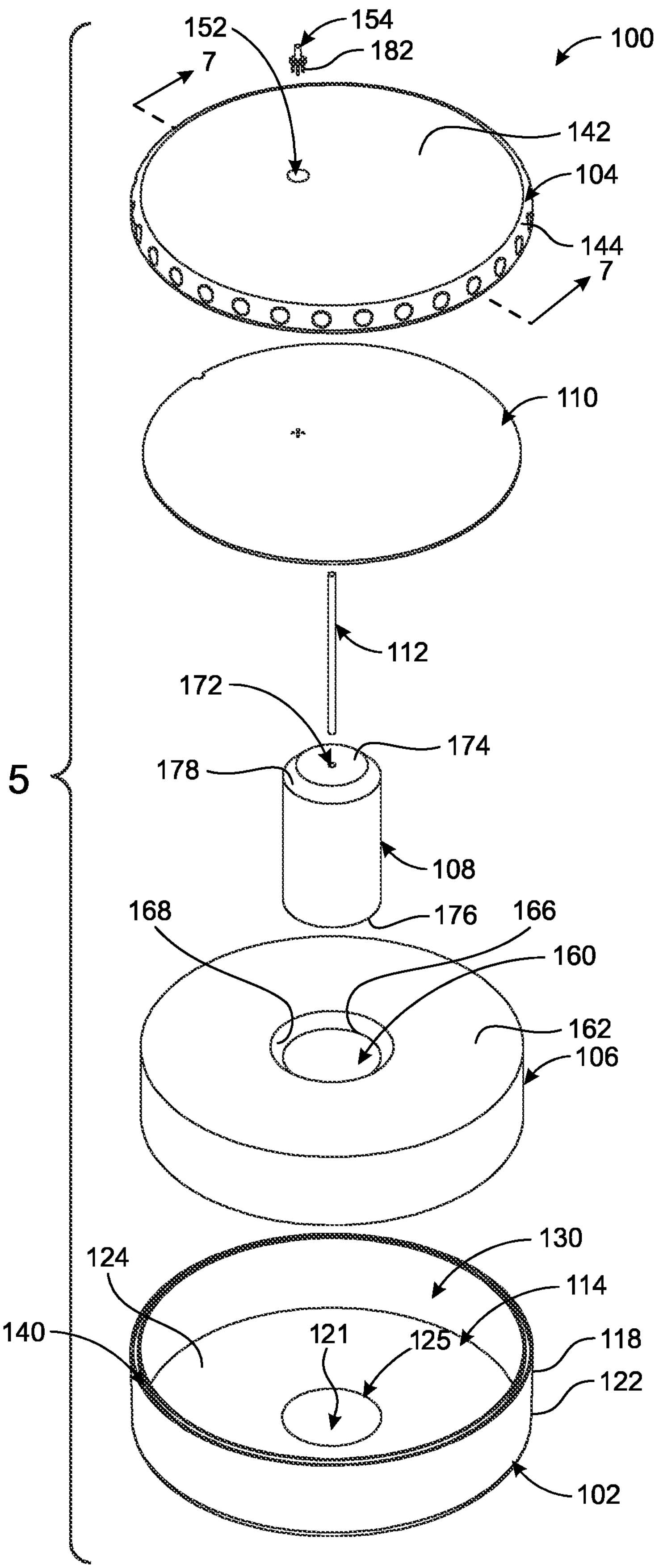
FIG. 5 is an exploded perspective view of the antenna of FIG. 1.
Figure 6:
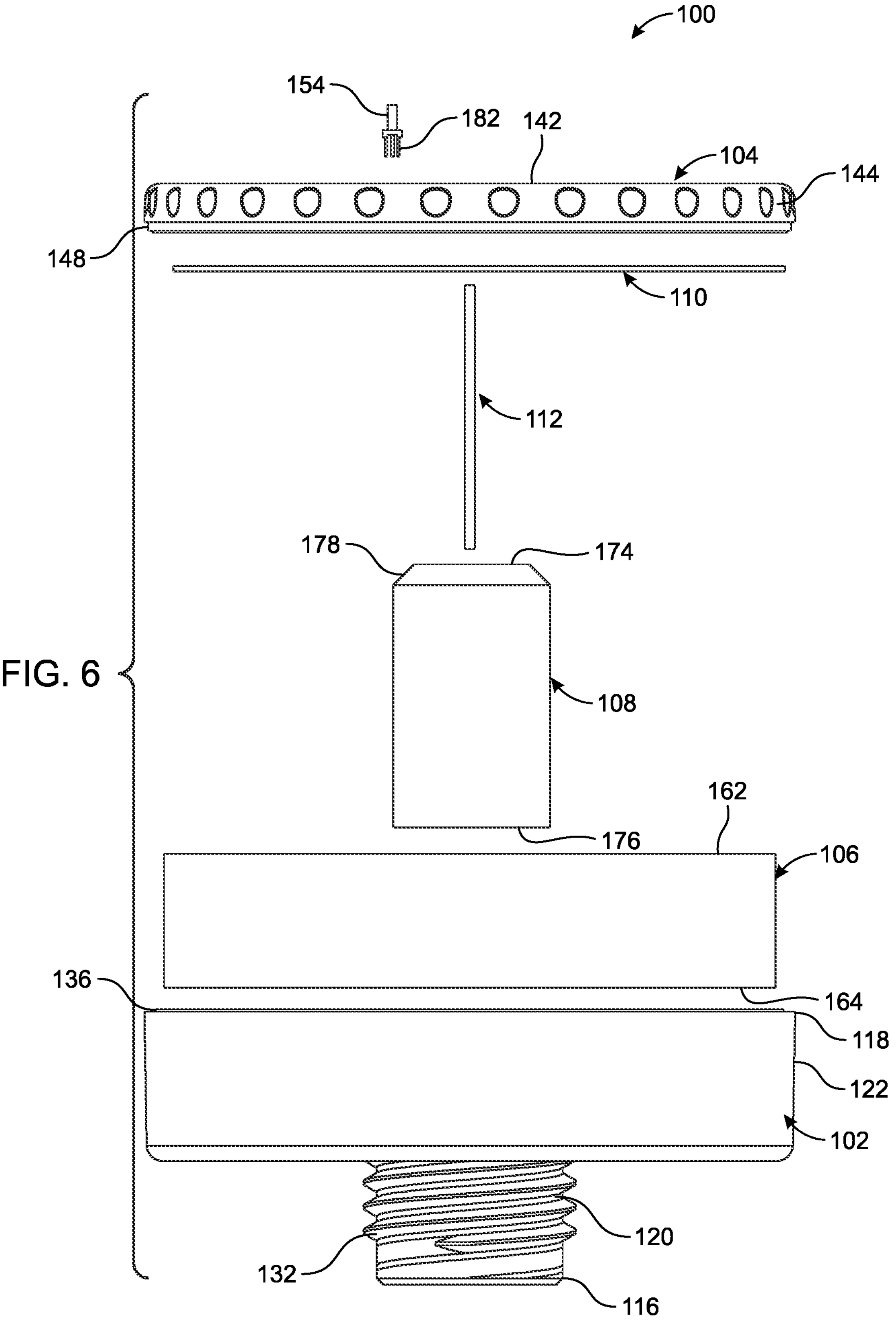
FIG. 6 is a side view in elevation thereof.
Figure 7:
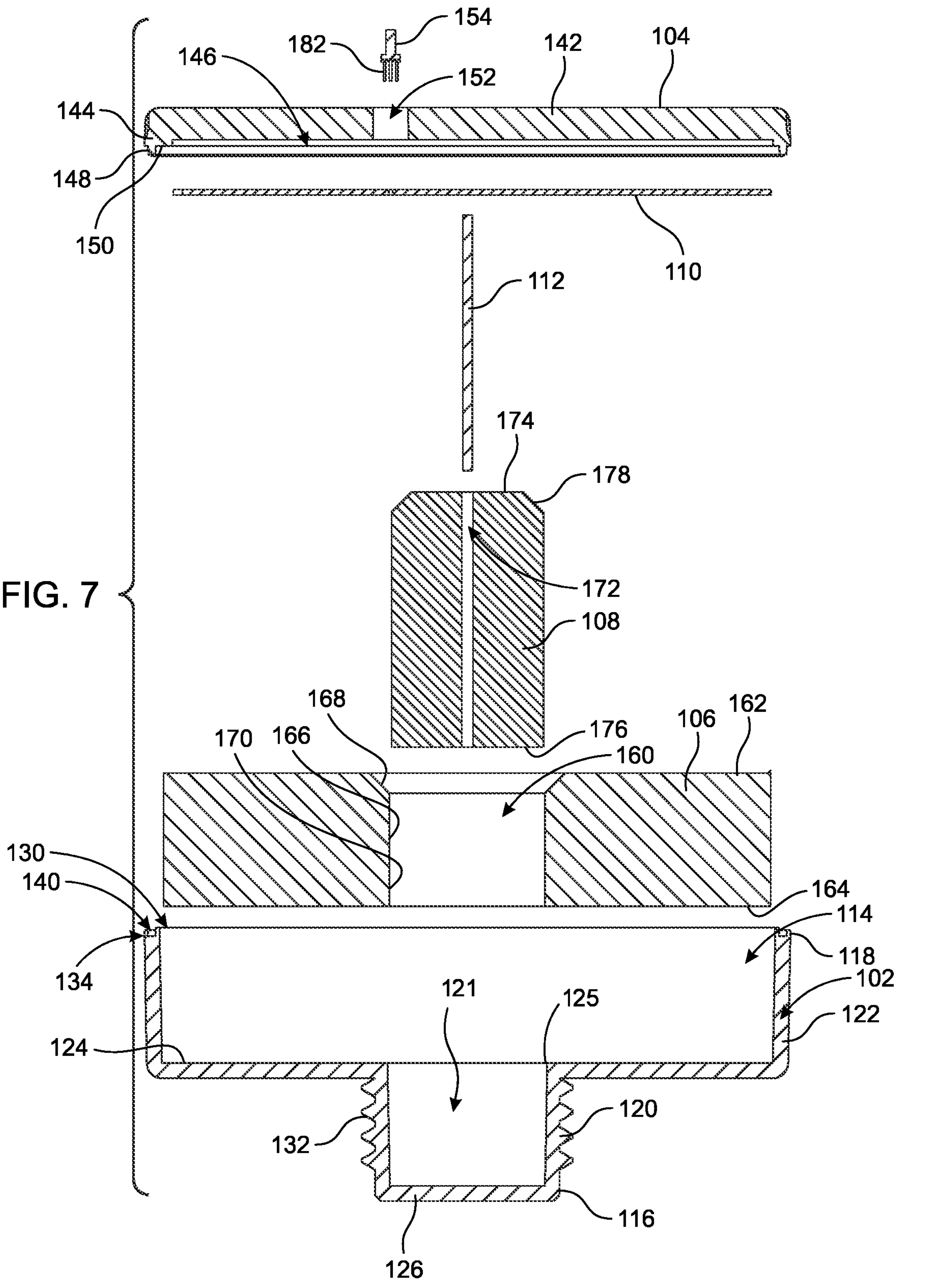
FIG. 7 is a cross-sectional side view in elevation thereof.

In an embodiment, rod 108 is made of polypropylene and may be formed by extrusion. Additionally, rod 108 includes a beveled portion 178 proximate the first end. Accordingly, when rod 108 is inserted into the central hole 160, a circular V-shaped groove 180 (shown in FIG. 2 and FIG. 4) is defined between the beveled edge 168 of the central hole 160 and the beveled edge 178 of the rod 108. It will be appreciated that prongs 182 of the cable connector 154 extend through the circuit board 110 and are disposed in the V-groove 180 in an assembly, as shown in FIG. 4.

In an embodiment, to manufacture the antenna 100, the rod 108 and the disk 106 are extruded. Wire 112 is inserted inside rod 108 and connected with the circuit board 110. Housing 102 may be over-molded around disk 106 and rod 108. Further, the cover plate 104 is connected with the housing 102. In an embodiment, the cover plate 104 may also be over-molded. Accordingly, the antenna 100 is hermetically sealed, and potting gel is nowhere employed in the antenna assembly. The antenna demonstrates superior performance characteristics in an underground installation relative to the prior art.

In manufacture, the top and bottom of antenna or cap 104 and cup 102 are injection molded. Then a large, extruded polypropylene disc 106 is set into cup 102. Next, a smaller extruded propylene disc 108 is inserted into disc 106. Then 12 AWG bare copper wire 112 is soldered to a printed circuit board 110, and the assembly is inserted into disc 108 and onto both 106 and 108. Lastly, cap 104 is hotplate welded to cup 102, hermetically sealing the antenna enclosure.

Thus, and as can be seen from the foregoing, in its most essential aspect, the antenna and antenna enclosure of the present invention includes a housing having a cylindrical first portion defining a hollow interior volume with an inner diameter, a cylindrical second portion defining a hollow interior portion having an inner diameter greater than the inner diameter of the first portion, and a disk disposed inside the second portion and defining a central hole. A rod is disposed in and extends through the central hole of the disk and is captured in the hollow interior volume of the cylindrical first portion. The rod defines a central opening and abuts an inner surface of the disk. Further, the antenna includes a wire arranged inside the central opening, and a cap covering the hollow interior of the cylindrical portion and engaged with the housing. A circuit board for the antenna is configured for placement on the underside of the cap to connect to the wire.

What is claimed as invention is:

1. A method for manufacturing and assembling of an antenna and underground antenna enclosure, comprising the steps of:

providing a monopole antenna assembly comprising a molded housing, a cover plate, a disk, a rod, a circuit board, and a conductive metal wire wherein:

the housing is formed out of a solid dielectric potting and encapsulating material using an injection molding process wherein the antenna housing has an interior chamber, comprising, a first cylindrical portion defining an interior volume that is hollow having a mounting post having a distal end having a closed integral cap;

a planar base extending around the opening to the interior volume of the first cylindrical portion;

a second cylindrical portion, also defining a hollow interior volume in fluid communication with the interior volume of the first cylindrical portion;

the cylindrical first portion and the cylindrical second portion are configured coaxially;

the cylindrical second portion having an inner diameter greater than the inner diameter of the cylindrical first portion;

a circumferential rim to surround and define the access opening to the interior volume in the cylindrical second portion opposite that of the distal end having a circumferential channel extending around the entirety of the circumference of the circumferential rim having an inner wall and an outer wall defining a groove therebetween wherein the height of the inner wall is greater than a height of the outer wall, and the groove extends circumferentially around the entirety of the channel structure;

the circumferential rim of the cylindrical second portion having an open end that defines an access opening or interior volume in and to the interior chamber;

the cover plate formed using injection molding configured to cover the access opening of the housing having a planar central disk and a sidewall arranged circularly around a central axis of the central disk and extending outwardly and around the central disk and defining a shallow cylindrical chamber wherein, the cover plate having a tongue structure extending circumferentially around the central axis of the cover plate outwardly in an axial direction from an edge of the sidewall having a width of the tongue structure is smaller than that of the sidewall for engagement with the housing, the disk formed by extruding polypyrene material having an outer diameter substantially slightly smaller than the second inner diameter of the housing and a height substantially equal to the height of the side wall of the cylindrical second portion wherein the disk defines a central hole extending from a first side to a second side of the disk;

the central hole in disk and the hollow interior of cylindrical first portion are each adapted to receive rod wherein, the rod has a substantially cylindrical structure and extends through the central hole into the hollow cylindrical volume of the cylindrical first portion;

the diameter of the rod is substantially equal to but slightly smaller than both the diameter of the first inner diameter and the diameter of the cylindrical portion of the central hole corresponding to the area circumscribed by the inner surface, the rod has a height substantially equal to the combined depth of the central hole and the depth of the interior volume of the cylindrical first portion, the rod also defines a central opening extending from a first end to a second end, the diameter of the central opening is substantially equal to but slightly larger than the metal wire that extends the length of the central opening wherein, the metal wire is made of electrically conducting material wherein, the wire is adapted to connect/contact the circuit board and has a length substantially equal to the height of the rod;

assembling the antenna and antenna enclosure comprising, setting the disk into housing, inserting the rod is inserted into disk, soldering the wire to a printed circuit board, inserting the wire into rod and onto both the disk, hotplate welding the cover plate cap is hotplate welded to the housing hermetically sealing the antenna enclosure.

2. The antenna and underground antenna enclosure product assembled through the process of claim 1.

* * * * *